BEST AVAILABLE COPY

ROBERT SPENCER.

Improvement in Saddle or Sweat Cloths.

No. 4,358. Reissued April 25, 1871.

41944

Witnesses,
Philip R. Forrest
F. P. Beecher

Inventor
Robt. Spencer

AM. PHOTO-LITHOGRAPHIC CO. N.Y. (OSBORNE'S PROCESS.)

United States Patent Office.

ROBERT SPENCER, OF NEWARK, NEW JERSEY.

Letters Patent No. 41,944, dated March 15, 1864; reissue No. 4,358, dated April 25, 1871.

IMPROVEMENT IN SADDLE OR SWEAT-CLOTHS.

The Schedule referred to in these Letters Patent and making part of the same.

*To all whom it may concern:*

Be it known that I, ROBERT SPENCER, of the city of Newark, in the county of Essex and State of New Jersey, have invented a new and useful Improvement in Saddle or Sweat-Cloths for military and other purposes; and I do hereby declare that the following is a full, clear, and exact description of the same, reference being had to the accompanying drawing making a part of this specification, in which—

Figure 1:
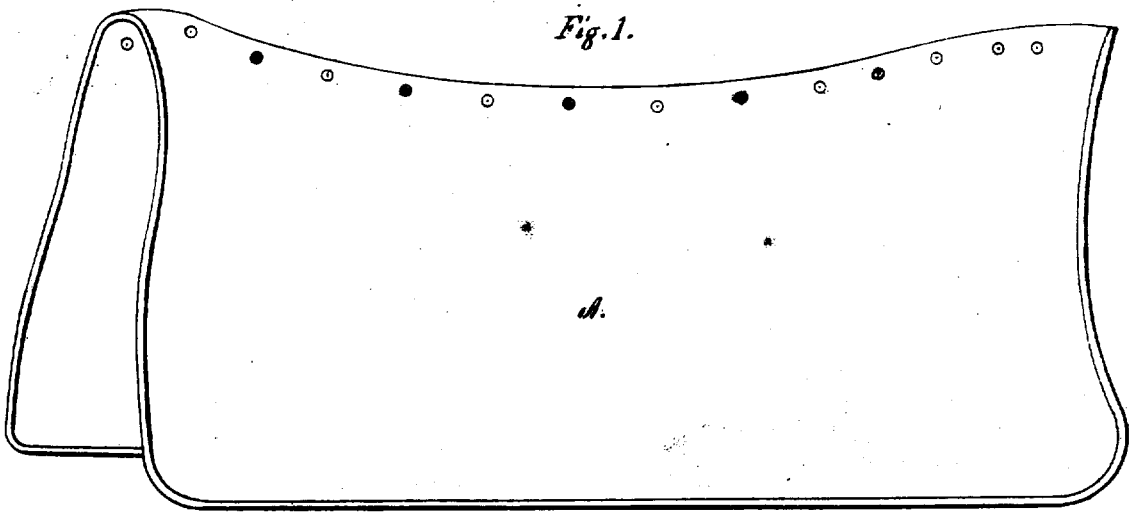
Figure 2:
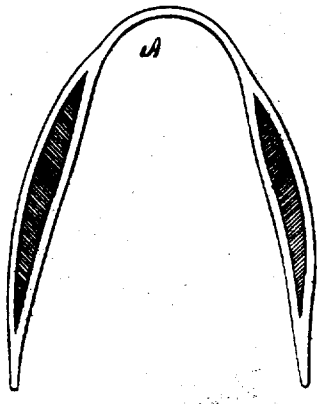

Figure 1 is a perspective view of my said cloth;

Figure 2, a transverse section of the same; and

Figure 3:
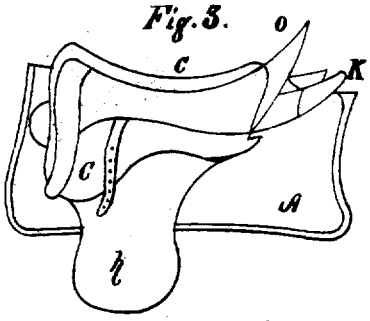

Figure 3 shows various modifications of my said invention when applied under or in connection with the saddle.

Heretofore saddle-cloths have been made of two or more pieces of material stitched together and presenting a seam along the ridge or back of the horse, to the injury often times of both horse and rider.

The cloth has also heretofore been made either of a single thickness or by stitching two or more parts one upon the other, a method open to objection on the score of expense and want of uniformity or graduation of the cloth.

The object is therefore to overcome these objections, and at the same time to produce a cloth thoroughly graduated as to thickness, strong and serviceable, without seam or ridge, shaped to the back of the horse, and in every respect adapted to its purpose.

The object is, further, to make such a combination of materials in making the cloth introduced, and worked in in such a manner as to produce in the cloth all the essential qualifications necessary in those respects, viz., cheapness, strength, lightness, elasticity, absorption, and ventilation.

In the drawing—

A is the cloth, shaped, as represented in fig. 1, to the outline of the back of the horse, and graduated in thickness, as shown by the section, fig. 2, being the thickest under the bearings of the saddle *b b*, fig. 2, and then at the edge also along the line of the center, where it is perforated, as shown in fig. 1.

The cloth may be formed of any suitable material, (wool or camel's hair being preferred,) and felted and pulled in the usual and required manner; or it may be woven in any suitable and convenient way.

Horse or cattle-hair may be introduced to thicken and form the bearings *b b*, fig. 2; or the same may be made up of successive layers of felt or other fabric, as experience may show to be the best.

In fig. 3 the cloth A is secured to the saddle by means of the pockets K K, already patented, and the exterior felt C C is only a modification of A, placed over the saddle to form a seat for the rider; or it may be extended over the whole saddle to form a housing; or it may be brought down or extended, as represented by *h*, fig. 3, to take the place of or form the flaps of the saddle.

What I claim as my invention, and desire to secure by Letters Patent, is—

1. As a new article of manufacture, a graduated saddle-cloth in which the varying thickness of the different parts is produced in the process of manufacture either by felting or weaving, substantially as described, as distinguished from a saddle-cloth in which the varying thickness is produced by sewing or stitching on pads or thickening, as was formerly done.

2. As a new article of manufacture, a graduated saddle-cloth in which the two similar sides are practically united in the process of manufacture by felting or weaving, substantially as described, as distinguished from one in which the two similar sides were separately made, and then united with each other by stitching or sewing.

ROBT. SPENCER.

Witnesses:

PHILIP R. FORREST,

T. B. BEECHER.